United States Patent [19]

King

[11] 4,045,808
[45] Aug. 30, 1977

[54] CAMERA MOUNTED FLASH EXTENDER AND POWER PACK THEREFOR

[76] Inventor: Dwayne L. King, 825 DeLucchi Lane No. 311, Reno, Nev. 89502

[21] Appl. No.: 583,187

[22] Filed: June 2, 1975

Related U.S. Application Data

[63] Continuation-in-part of Ser. No. 462,418, April 19, 1974, Pat. No. 3,893,145.

[51] Int. Cl.² .............................................. G03B 15/02
[52] U.S. Cl. ..................................... 354/126; 240/1.3; 354/293; 403/87; 403/138
[58] Field of Search ................. 240/1.3; 354/126, 293, 354/81, 145; 403/84, 87, 90, 138

[56] References Cited

U.S. PATENT DOCUMENTS

| | | | |
|---|---|---|---|
| 2,256,763 | 9/1941 | Reed | 403/90 X |
| 2,275,687 | 3/1942 | Schubert | 354/293 X |
| 2,672,313 | 3/1954 | Poole | 403/90 X |
| 2,697,776 | 12/1954 | Wale | 240/1.3 |
| 2,700,523 | 1/1955 | Pollard | 354/293 X |
| 2,776,364 | 1/1957 | Daniels | 240/1.3 |
| 3,026,409 | 3/1962 | Deisch | 240/1.3 |
| 3,128,982 | 4/1964 | Christopher | 354/293 X |
| 3,187,170 | 6/1965 | Kille | 240/1.3 |
| 3,240,516 | 3/1966 | Barish et al. | 403/90 X |
| 3,289,563 | 12/1966 | Kent | 354/293 |

FOREIGN PATENT DOCUMENTS

| | | | |
|---|---|---|---|
| 544,227 | 6/1956 | Italy | 240/1.3 |

*Primary Examiner*—Fred L. Braun
*Attorney, Agent, or Firm*—Birch, Stewart, Kolasch & Birch

[57] ABSTRACT

A photographic apparatus including a telescopic extender connected between a camera and an electronic flash or strobe unit by a pair of universal joints at the respective ends of the extender. The extender and flash unit may be selectively adjusted to virtually any position with respect to the camera and the subject being photographed. In one embodiment the universal joint coupling the extender to the camera is a ball type joint. In another embodiment the universal joint is an adjustable swivel joint which permits rotation about two mutually perpendicular axis. Elements are provided for retaining the flash unit and extender in a compact storage position. The flash extender described may comprise a plurality of oval shaped telescoping sections. The strobe unit consists of two separate housings, a main housing for the power source and a second housing for the flash lamp and trigger element therefor.

5 Claims, 6 Drawing Figures

U.S. Patent    Aug. 30, 1977    Sheet 1 of 2    4,045,808
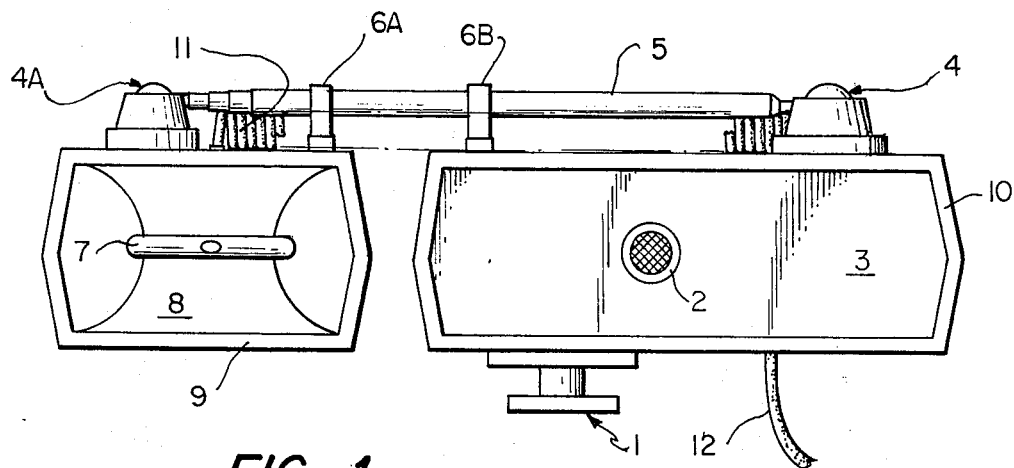
FIG. 1
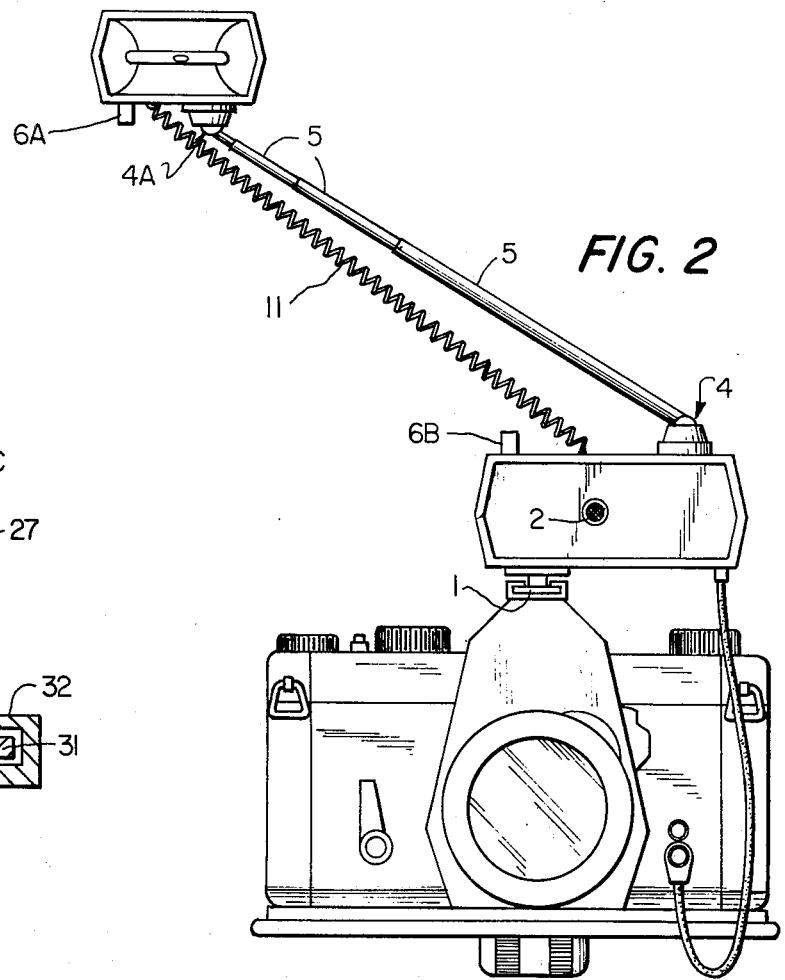
FIG. 2
FIG. 6

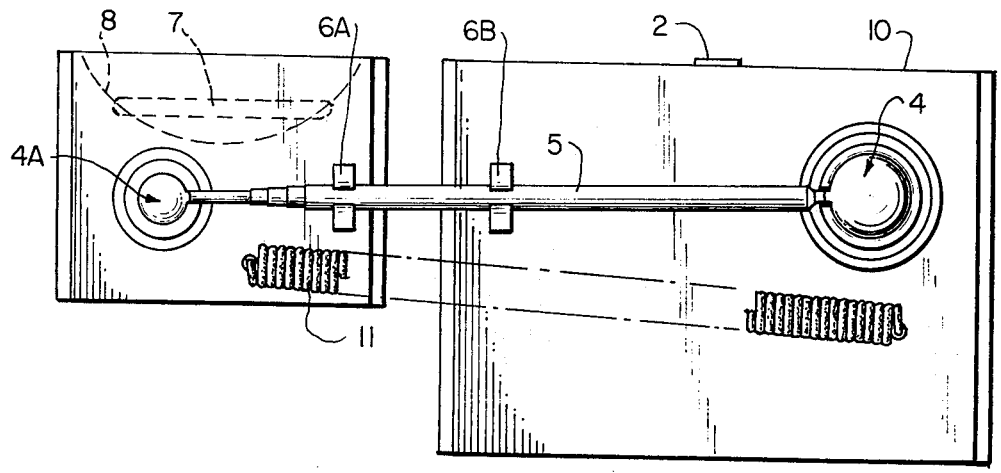
FIG. 3
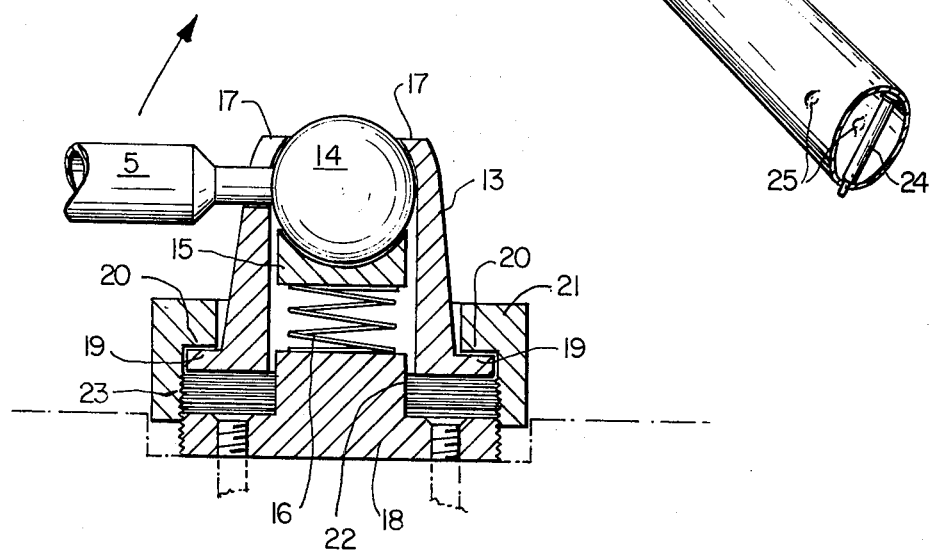
FIG. 5
FIG. 4

CAMERA MOUNTED FLASH EXTENDER AND POWER PACK THEREFOR

This application is a continuation-in-part of copending application Ser. No. 462,418 filed Apr. 19, 1974, now U.S. Pat. No. 3,893,145, entitled "Strobe Extender and Camera Support". It is intended to incorporate the disclosure of said copending application herein by reference.

FIELD OF INVENTION

The present invention relates to an adjustable combined remote support for a camera at one end and an electronic flash means at the other end, to thereby provide strobe flash illumination of a subject to be photographed.

More particularly this invention comprises a novel support for a strobe and a camera formed of detachable jointed sections extensible to provide angular adjustments of strobe position for electronic flash illumination from a suitable power source of a subject with respect to the camera for optimum photographic results without careful regard to specific camera shutter speed settings and the need of special films and filters heretofore critical for good phtographic results with continuous illumination means.

BACKGROUND OF INVENTION

This combined strobe estender and camera support means makes electronic flash photographs with remote camera position at the base end of the strobe extender means efficient either indoors or outdoors and is a great boon to amateur photographers. Flash illumination with a strobe flash mounted on the end of a universal joint to swivel on the end of an extender section of the extender adds little or no complications to picture-taking, while adding greatly to subject possibilities.

When using flash illumination, it is known to be most effective from 4 to 10 feet. Too close and the picture will have a washed-out faded effect; too far, and the picture will be dark and will not bring out depth of field and visual details.

Also, it is important to be able to adjust the strobe flash means at an angle to any shiny surface so that the flash does not reflect in the surface and be picked up in the picture. Further to avoid shadows, the subject to be photographed should be kept away from the wall and avoid reflective flash bounce from wall or ceiling when taking the picture.

Further, the present novel strobe extender and camera support enhances the efficiency of outdoor photography as artistic lighting effects are provided by using the sun as the main overhead light and strobe as fill light. Also, the strobe extender and support is ideal for shady areas or when the subject's back is to the sun. This eliminates unnecessary eye squinting and tension in the subject to be photographed. Because of the strobe extender and support size, it can be knocked down to provide for portability and taken anywhere with ease.

For example, instead of setting up cumbersome light stands, the same artistic lighting effects are provided with one strobe extended as an overhead main light and another strobe angled as a fill light for various shadow effects and lighting key ratio. To photograph a large group of subjects two strobe extenders can be mounted from one sturdy tripod to make up the basic photo lighting system.

SUMMARY OF INVENTION

The strobe extender of the present invention is a modification or improvement of the strobe extender disclosed in the aforementioned patent application of which this application is a continuation-in-part.

In the present invention the strobe unit consists of first and second housings, the first housing containing the main power supply and the second housing containing only a flash lamp and starter elements therefor. The housing or encasement containing the flash lamp can be made to weigh a couple of ounces, while the flash unit in the aforementioned parent case could weigh on the order of eighteen ounces. Accordingly, when the flash unit of the present invention is extended to a distance of three feet or more and at an angle, the unit weighing less than an ounce is more easily held by hand and balanced than a strobe weighing eighteen ounces. Moreover, the main housing of the strobe is located substantially centrally of the camera and, therefore, helps balance the overall device.

The strobe extender of the present invention also includes means for retaining the first and second strobe housings and the extender in a collapsed compact storage position. Catch means are provided for snapping these elements together in such a position.

The telescopic extender in the present invention in a preferred embodiment consists of a plurality of oval shaped telescopic sections. The oval shape helps stabilize and preclude the sections from twisting with respect to one another.

The present invention also embraces two additional embodiments of a universal joint connecting the extender to the camera. In one embodiment the universal joint is a pressure locking ball joint. In another embodiment the universal joint is a hinge mounted on a rotatable base.

Accordingly, it is a primary object of the present invention to provide an extender for a camera attached strobe which can be easily adjusted to any desired position and angle with respect to a subject to be photographed.

It is another object of the present invention to provide a strobe and extender of light weight and good balance.

It is still another object of the present invention to provide a strobe and extender which is compact and easily collapsed to a storage position.

It is a further object of the present invention to provide universal joints for use with the extender of the present invention which facilitate efficient and easy adjustment of the flash unit to selected positions.

It is still a further object of the present invention to provide a telescopic tube of increased stability for use with the strobe of the present invention.

BRIEF DESCRIPTION OF DRAWINGS

For a fuller understanding of the nature and objects of the invention, reference should be had to the following detailed description taken in connection with the accompanying drawings wherein:

FIG. 1 is a front view of the present invention showing the photographic apparatus of the present invention in a collapsed or storage position;

FIG. 2, is a front view illustrating a camera with the photographic apparatus of the present invention in an extended and pivoted position;

FIG. 3 is a top view of the photographic apparatus of FIG. 1;

FIg. 4 is a side elevation view in section of an adjustable pressure locking ball joint;

FIG. 5 is a perspective view of telescopic sections of the telescopic extender in a partially extended position; and FIG. 6 is a side elevation view of another universal locking hinge that might support the telescopic extensions.

DETAILED DESCRIPTION OF DRAWINGS

Referring in detail to the drawings and with particular reference to FIGS. 1 to 3 there is shown an assembled embodiment of the novel extension strobe of the present invention including a main strobe housing 3 for containing a power supply to be described hereinafter. A swivel pressure locking ball joint 4 is supported on housing 3 by bolts or other suitable means. A telescopic extender 5 has a first end coupled to ball joint 4 and a second end coupled to another pressure locking ball joint 4a connected to a flash or illumination means. The illumination means includes a flash tube 7 and a reflector 8, mounted in an insulated encasement 9. Also housed within encasement 9 may be a trigger capacitor and trigger coil for the flash tube. A three conductor retractible power cord 11 is suitably connected to the main strobe housing 3 and flash means. Stablizing catches 6A and 6B are provided to the telescopic sections 5 to anchor both the flash unit and strobe housing 3 to the telescopic extender.

Also shown in FIG. 1 is a flange means 1 to provide a male accessory of standard size for supporting the main strobe housing 3, a light sensor 2 to accurately read lighting exposure of the subject and thus enable the strobe to automatically adjust lighting exposure, and power ignition cord 12 to activate the strobe flash from a camera, as shown in FIG. 2.

The main strobe housing 3 may contain for example the elements generally considered to be the power source for an electronic strobe. These elements may include a battery, a transistor oscillator, a step-up transformer, and a main capacitor. Housing 3 or encasement 9 on the other hand may include a trigger capacitor and trigger coil for flash lamp 7. The foregoing is offered only by way of example it being understood that other types of power supplies and trigger means may be used without departing from the spirit and scope of the present invention.

As illustrated in FIG. 4, a telescopic extender 5 is connected with a ball collar or cage 13 adapted to hold and cage the ball of swivel ball 14. This ball joint may be locked in any swiveled angular position by a gripping plate 15. A spring 16 applies pressure to both gripping plate 15 which in turn pressure locks ball 14 between the gripping plate 15 and inturned flanges 17 of ball collar 13, and against base anchor plate 18. This also pressure locks the swivel means of ball collar 13 by forcing upper flange surface 19 of ball collar 13 against the inturned flanges 20 of the base collar 21. Flange 19 is circular and is pivotally mounted about an upstanding portion 22 of plate 18. The reduced shank or upstanding portion 22 mates with inside bore of ball collar 13 to form a spring cavity. The base anchor plate 18 also has threaded grooves to mate with threaded bore 23 of collar 21. Locking pressure of the ball joint may be adjusted to a desired magnitude by turning base collar 21. This increases or decreases the spring cavity between reduced shank 22 of base anchor plate 18 and gripping plate 15.

In reference to FIG. 5, the telescopic sections 5 may be manually extended or collapsed as required for any desirable flash position in relation to the camera. More specifically the telescopic extensions consist of, for example, ten telescopic sections 5, which are oval shaped to stabilize and preclude the sections from twisting when there is an uneven weight resulting from the position of the flash illumination housing 9. Locking detent pins 24 are preferably staggered in opposite directions in every other section or extension 5 to lock the telescopic extensions into place. This creates and maintains an even balance and permits a smooth torque free collapse of the telescopic sections. Each telescopic section also contains two indent stops 25. When collapsing the telescopic section, these stops prevent the next adjacent telescopic section from shearing off the locking detent pin 24 of the latter or trailing telescopic section. The sudden stop also initiates the disengagement of the detent pin 24 in the preceeding telescopic section.

Attached to the extensible end of the telescopic extender is another adjustable pressure locking ball joint 4a approximately two thirds of the size of the extendable ball joint 4. Joint 4a may be of the same type as joint 4 or it may be of the type such as 39 illustrated in application Ser. No. 462,418 filed Apr. 19, 1974 of which this application is a continuation-in-part.

There are many universal hinges that might be used to adjustably lock the telescopic sections in angular positions without departing from the spirit and scope of the present invention. For example, FIG. 6 is a side elevational view of one such universal joint. A locking bolt 26 with a reduced shank partly threaded on the end 27 extends through ear portion 28B of a bifurcated hinge collar continues through hinge 29, and mates with a threaded bore of the opposite ear portion 28C of the hinge collar. As the reduced thread shank 27 is screwed into the threaded split collar ear portion 28C, the shoulder of locking bolt 26 pushes against the flanged surface 28A of the split collar and closes the split ear portions of the hinge collar against the hinge to lock it into selected vertical positions. As the split ear portions 28B and 28C of the hinge collar 28 close, they are forced upwards by a wedge surface 30A of upstanding post 30. This locks upper flange surface 31 of split collar 28 against the inturned flange surface 32 of base plate 33 to lock collar 28 in selected horizontal positions.

The apparatus of the present invention may be modified as it would occur to one of ordinary skill in the art without departing from the spirit and scope of the present invention.

What is claimed is:

1. A photographic apparatus including in combination a telescopic extender means, coupling means for coupling a first end of said extender to a camera and a flash illumination means coupled to a second end of said extender, the improvement comprising:

universal joint means connected to said coupling means for providing pivotal movement of said telescopic extender about two mutually perpendicular axes passing substantially through said first end of said extender, said universal joint means including a bifurcated collar having a substantially cylindrical base and a pair of upstanding ear portions, said base including a central bore and a circular bottom flange, base plate means for supporting said bottom flange and said bifurcated collar for pivotal movement therein about one of said axes, said base plate including an upstanding post extending into said central bore, said post having cam surfaces which engage the sides of said bore, bolt means journaled in said ear portions, hinge means for pivotally supporting said first end of said telescopic extender on said bolt means, for movement about the other of said axes; and means for turning said bolt means to lock said joint against pivotal movement about either of said mutually perpendicular axes; and ball joint means coupling said flash illumination means to said second end, said ball joint means providing pivotal movement of said flash illumination means about at least two mutually perpendicular axes passing substantially through said second end.

2. A photographic apparatus including in combination a telescopic extender means, coupling means for coupling a first end of said extender to a camera and flash illumination means coupled to a second end of said extender, the improvement comprising:

first ball joint means connecting said coupling means to said first end of said extender for pivotal movement about at least two mutually perpendicular axes passing substantially through said first end;

second ball joint means coupling said flash illumination means to said second end, said second ball joint means providing pivotal movement of said flash illumination means about at least two mutually perpendicular axes passing substantially through said second end;

said coupling means including a housing means connected between said camera and said first ball joint means for containing at least a power source for said flash illumination means;

first catch means disposed on said housing means for snapping engagement with said telescopic extender in a predetermined position of said extender; and second catch means disposed on said flash illumination means for snapping engagement with said extender in a predetermined position of said flash illumination means.

3. A photographic apparatus including in combination a telescopic extender means, coupling means for coupling a first end of said extender to a camera and flash illumination means coupled to a second end of said extender, the improvement comprising:

a first universal hinge means connected to said means for coupling for providing pivotal movement of said telescopic extender about at least two mutually perpendicular axes passing through said first end;

a second universal hinge means coupling said flash illumination means to said second end of said extender, said second universal hinge means providing for pivotal movement of said flash illumination means about at least two mutually perpendicular axes passing through said second end;

said coupling means including a housing means connected between said camera and said first universal hinge means for containing at least a power source for said flash illumination means;

first catch means disposed on said housing means for snapping engagement with said telescopic extender in a predetermined position of said extender; and second catch means disposed on said flash illumination means for snapping engagement with said extender in a predetermined position of said flash illumination means.

4. A photographic apparatus comprising:

camera means;

telescopic extender means;

flash illumination means;

housing means for containing at least a power source for said flash illumination means, said housing means including a top surface, a bottom surface, and first and second end surfaces;

coupling means connecting said bottom surface of said housing means to a central portion of the top of said camera means adjacent said first end surface of said housing means;

first ball joint means connecting said top surface of said housing means adjacent said second end surface thereof to a first end of said extender means for pivotal movement about at least two mutually perpendicular axes passing substantially through said first end;

second ball joint means coupling said flash illumination means to a second end of said extender means, said second ball joint means providing pivotal movement of said flash illumination means about at least two mutually perpendicular axes passing substantially through said second end;

whereby said flash illumination means may be pivoted to a compact storage position adjacent said top of said camera in juxtaposition to said housing means; and catch means for holding said flash illumination means in said storage position.

5. The photographic apparatus of claim 4 wherein said telescopic extender means comprises a plurality of oval shaped telescoping sections.

* * * * *